(12) United States Patent
Yasuda

(10) Patent No.: US 11,363,622 B2
(45) Date of Patent: Jun. 14, 2022

(54) CONTROL APPARATUS, TO-BE-CONTROLLED DEVICE, CONTROL SYSTEM, CONTROL METHOD, METHOD FOR CONTROLLING TO-BE-CONTROLLED DEVICE, PROGRAM FOR CONTROL APPARATUS, AND PROGRAM FOR TO-BE-CONTROLLED DEVICE

(71) Applicant: NEC Corporation, Tokyo (JP)

(72) Inventor: Shinya Yasuda, Tokyo (JP)

(73) Assignee: NEC CORPORATION, Tokyo (JP)

(*) Notice: Subject to any disclaimer, the term of this patent is extended or adjusted under 35 U.S.C. 154(b) by 38 days.

(21) Appl. No.: 16/755,977

(22) PCT Filed: Nov. 15, 2018

(86) PCT No.: PCT/JP2018/042212
§ 371 (c)(1),
(2) Date: Apr. 14, 2020

(87) PCT Pub. No.: WO2019/098258
PCT Pub. Date: May 23, 2019

(65) Prior Publication Data
US 2020/0305180 A1     Sep. 24, 2020

(30) Foreign Application Priority Data

Nov. 17, 2017 (JP) .............................. JP2017-222125

(51) Int. Cl.
*H04W 72/12* (2009.01)

(52) U.S. Cl.
CPC ............................ *H04W 72/1278* (2013.01)

(58) Field of Classification Search
CPC .............................................. H04W 72/1278
See application file for complete search history.

(56) References Cited

U.S. PATENT DOCUMENTS

2010/0211190 A1* 8/2010 Akita ................ G05B 19/4142
700/3
2010/0220698 A1* 9/2010 Miyamoto ............ H04L 1/1883
370/338

(Continued)

FOREIGN PATENT DOCUMENTS

JP          07-307769        11/1995
JP       2016-119553 A       6/2016

(Continued)

OTHER PUBLICATIONS

International Search Report dated Jan. 22, 2019, in corresponding PCT International Application.

*Primary Examiner* — Duc C Ho

(57) ABSTRACT

In order to realize a control apparatus capable of stably controlling a to-be-controlled device, a to-be-controlled device, a control system, a control method, a method for controlling a to-be-controlled device, a program for a control apparatus, and a program for a to-be-controlled device, a control apparatus according to the present invention is provided with: a transmission means for transmitting a control signal at a prescribed transmission interval to a to-be-controlled device that sends out a reply signal upon receipt of the control signal; a reception means for receiving the reply signal; and a control means for calculating a communication delay time from the difference between a transmission time of the control signal and a reception time of the reply signal, and then changing the prescribed transmission interval such that the sum of the prescribed transmission interval and the communication delay time satisfies a prescribed condition.

26 Claims, 11 Drawing Sheets

(56) References Cited

U.S. PATENT DOCUMENTS

2014/0032702 A1\* 1/2014 Ozawa ................ H04L 67/2852
                                                                709/213
2016/0127213 A1    5/2016 Shimada
2016/0182388 A1    6/2016 Tsuruoka
2016/0307440 A1\* 10/2016 Amano .................. G08C 17/00

FOREIGN PATENT DOCUMENTS

WO    WO 2015/011757 A1    1/2015
WO    WO 2015/083514 A1    6/2015

\* cited by examiner

PRIOR ART

CONTROL APPARATUS, TO-BE-CONTROLLED DEVICE, CONTROL SYSTEM, CONTROL METHOD, METHOD FOR CONTROLLING TO-BE-CONTROLLED DEVICE, PROGRAM FOR CONTROL APPARATUS, AND PROGRAM FOR TO-BE-CONTROLLED DEVICE

CROSS-REFERENCE TO RELATED PATENT APPLICATIONS

This application is a National Stage Entry of International Application No. PCT/JP2018/042212, filed Nov. 15, 2018, which claims priority from Japanese Patent Application No, JP 2017-222125, filed Nov. 17, 2017. The entire contents of the above-referenced applications are expressly incorporated herein by reference.

TECHNICAL FIELD

The present invention relates to a control apparatus, a to-be-controlled device, a control system, a control method, a method for controlling the to-be-controlled device, a program for the control apparatus, and a program for the to-be-controlled device.

BACKGROUND ART

In recent years, as exemplified by Internet of Things (IoT), various types of devices are connected to the Internet, and the number of such cases has increasingly grown. Particularly, wireless Internet protocol (IP) communication, which is advantageous in lifting restrictions on arrangement and movement of a device, has been actively used. Some devices include autonomous control systems, and others don't.

The autonomous control system may also be referred to as a machine control system, and is a system that performs control by the own machine alone by supplying feedback of a signal detected by a sensor, for example. Stability of the autonomous control system is maintained even when a network is shut down, but the cost of the device is more likely to be expensive.

Meanwhile, in a networked control system in which a to-be-controlled device is externally controlled via a network such as wireless IP communication, the to-be-controlled device is controlled in the following manner. That is, the to-be-controlled device transmits a signal detected by a sensor to a control apparatus, and the control apparatus performs calculation for control. Then the control apparatus transmits a control signal to the to-be-controlled device via the network. The to-be-controlled device operates based on the received control signal.

In the networked control system, a computer resource of the to-be-controlled device can be saved, and reduction in size and cost of the to-be-controlled device can be achieved. Moreover, centralized control using information on a number of to-be-controlled devices can be achieved.

Herein, a difference between the machine control system and the networked control system is described by giving posture control of a drone (multicopter) as an example.

In order to remain stationary in the air, a drone is required to detect a tilt of the own device with a sensor every few milliseconds and continuously adjust an output of each motor in such a way as to cancel the tilt. In the machine control system, a series of cycle from information acquisition to output adjustment is performed by a machine (in this case, the drone). Further, a time interval required for performing the series of cycle is referred to as a control period.

Herein, when the control period is long, a timing for performing control is likely to be delayed, and the system is unstabilized. Therefore, a shorter control period is considered to enable more precise control for the to-be-controlled device.

However, a certain time is required for a motor and the like to respond after the control signal is input. Thus, the control period cannot be reduced limitlessly. For a typical drone, control is performed at a period of several hundred Hz.

In contrast, in the networked control system, a control command is transmitted to the to-be-controlled device at a certain interval. The to-be-controlled device receives the control command, and changes an output of the motor. In this case, a reply signal acquired from the sensor at this timing is transmitted to the control apparatus. When receiving the reply signal, the control apparatus is capable of calculating a subsequent control command.

More specifically, the control apparatus connected to the drone via the network transmits a control signal instructing a rotational speed of each motor of the drone via the network. The drone receiving the control signal changes an output of the motor in such a way that the motor rotates as instructed, and at the same time, reads a current tilt from the sensor and transmits a reply signal to the control apparatus via the network.

Under the networked control described above, the drone itself is not required to calculate a motor output. The control apparatus repeats a series of operation of calculating a new rotational speed according to information acquired from the reply signal and transmitting a control signal to the drone.

Herein, similarly to the control period in the machine control system described above, a shorter interval for transmitting the control signal is considered to enable more precise control for the to-be-controlled device.

As an attempt to achieve communication for controlling a to-be-controlled device in real time via a network, PTL 1 is exemplified.

PTL 1 proposes a system that dynamically adjusts a transmission data rate by notifying a data transmission source of a processing time of a data reception terminal.

CITATION LIST

Patent Literature

[PTL 1] International Publication No. WO 2015/083514

SUMMARY OF INVENTION

Technical Problem

As described above, it is considered that, as the transmission interval at which the control apparatus transmits the control signal is shorter, the to-be-controlled device can be controlled more precisely.

However, as an issue unique to the networked control system, presence of a communication delay time is given.

The communication delay time is a delay time of transmission/reception data caused by factors such as occurrence of cross traffic on the network and, particularly in a case of wireless communication, occurrence of radio wave interference and noise during communication of a control signal and a reply signal.

FIG. 11 illustrates a relationship between the communication delay time and the interval for transmitting the control signal.

Herein, when the control apparatus transmits the control signal in an extremely short period, a device or a to-be-controlled device forming a network does not keep up with processing of a packet, which disadvantageously increases the communication delay time. As a result, an operation of the to-be-controlled device is unstabilized.

In this manner, when the interval for transmitting the control signal is varied, the communication delay time is also varied.

Therefore, in order for the control apparatus to stably control the to-be-controlled device, it is required to optimize the interval for transmitting the control signal and the communication delay time.

In the technique proposed in PTL 1, the control apparatus is not capable of optimizing the interval for transmitting the control signal and the communication delay time.

The present invention has an object to provide a control apparatus, a to-be-controlled device, a control system, a control method, a method for controlling the to-be-controlled device, a program for the control apparatus, and a program for the to-be-controlled device that stably control the to-be-controlled device.

Solution to Problem

In order to achieve the above-mentioned object, according to one aspect of the present invention, a control apparatus includes a transmission means for transmitting a control signal at a predetermined transmission interval to a to-be-controlled device that transmits a reply signal when receiving the control signal, a reception means for receiving the reply signal, and a control means for calculating a communication delay time from a difference between a transmission time of the control signal and a reception time of the reply signal and changing the predetermined transmission interval in such a way that a sum of the predetermined transmission interval and the communication delay time satisfies a predetermined condition.

In order to achieve the above-mentioned object, according to another aspect of the present invention, a to-be-controlled device includes a transmission means for transmitting a reply signal at a predetermined transmission interval to a control apparatus that transmits a control signal when receiving the reply signal, a reception means for receiving the control signal, and a control means for calculating a communication delay time from a difference between a transmission time of the reply signal and a reception time of the control signal, and changing the predetermined transmission interval in such a way that a sum of the predetermined transmission interval and the communication delay time satisfies a predetermined condition.

In order to achieve the above-mentioned object, according to another aspect of the present invention, a control system includes at least one to-be-controlled device and a control apparatus, wherein the at least one to-be-controlled device includes a transmission means for transmitting a reply signal at a predetermined transmission interval to the control apparatus that transmits a control signal when receiving the reply signal, a reception means for receiving the control signal, and a control means for calculating a communication delay time from a difference between a transmission time of the reply signal and a reception time of the control signal, and changing the predetermined transmission interval in such a way that a sum of the predetermined transmission interval and the communication delay time satisfies a predetermined condition; and the control apparatus and the at least one to-be-controlled device are connected to a network.

In order to achieve the above-mentioned object, according to another aspect of the present invention, a control method includes transmitting a control signal at a predetermined transmission interval to a to-be-controlled device that transmits a reply signal when receiving the control signal, receiving the reply signal, and calculating a communication delay time from a difference between a transmission time of the control signal and a reception time of the reply signal and changing the predetermined transmission interval in such a way that a sum of the predetermined transmission interval and the communication delay time satisfies a predetermined condition.

In order to achieve the above-mentioned object, according to another aspect of the present invention, a control method of a to-be-controlled device includes transmitting a reply signal at a predetermined transmission interval to a control apparatus that transmits a control signal when receiving the reply signal, receiving the control signal, and calculating a communication delay time from a difference between a transmission time of the reply signal and a reception time of the control signal, and changing the predetermined transmission interval in such a way that a sum of the predetermined transmission interval and the communication delay time satisfies a predetermined condition.

In order to achieve the above-mentioned object, according to another aspect of the present invention, a program for a control apparatus causes a computer to execute transmitting a control signal at a predetermined transmission interval to a to-be-controlled device that transmits a reply signal when receiving the control signal, receiving the reply signal, and calculating a communication delay time from a difference between a transmission time of the control signal and a reception time of the reply signal and changing the predetermined transmission interval in such a way that a sum of the predetermined transmission interval and the communication delay time satisfies a predetermined condition.

In order to achieve the above-mentioned object, according to another aspect of the present invention, a program for a to-be-controlled device causes a computer to execute transmitting a reply signal at a predetermined transmission interval to a control apparatus that transmits a control signal when receiving the reply signal, receiving the control signal, and calculating a communication delay time from a difference between a transmission time of the reply signal and a reception time of the control signal, and changing the predetermined transmission interval in such a way that a sum of the predetermined transmission interval and the communication delay time satisfies a predetermined condition.

In order to achieve the above-mentioned object, according to another aspect of the present invention, a control system includes a control apparatus and at least one to-be-controlled device, wherein the control apparatus includes a transmission means for transmitting a control signal at a predetermined transmission interval to the to-be-controlled device that transmits a reply signal when receiving the control signal, a reception means for receiving the reply signal, and a control means for calculating a communication delay time from a difference between a transmission time of the control signal and a reception time of the reply signal and changing the predetermined transmission interval in such a way that a sum of the predetermined transmission interval and the communication delay time satisfies a predetermined condition; and the control apparatus and the at least one to-be-controlled device are connected to a network.

Advantageous Effects of Invention

With the control apparatus, the to-be-controlled device, the control system, the control method, the method for controlling the to-be-controlled device, the program for the control apparatus, and the program for the to-be-controlled device according to the present invention, even when the communication delay time is long, the control apparatus transmits the control signal at the optimal transmission interval.

EXAMPLE EMBODIMENT

First Example Embodiment

Figure 1:
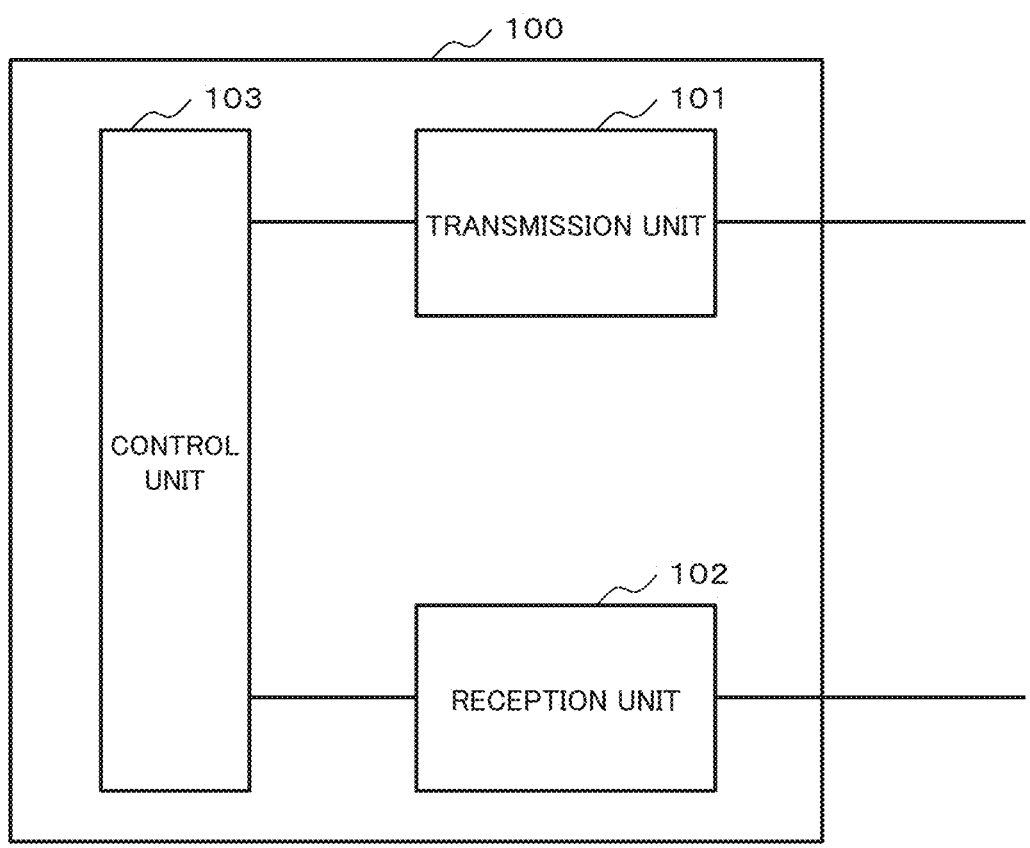
FIG. 1 is a diagram illustrating a configuration example according to a first example embodiment.

Next, with reference to FIG. 1, an example embodiment of the present invention is described.

A control apparatus 100 according to the present example embodiment includes a transmission unit 101 that transmits a control signal at a predetermined transmission interval to a to-be-controlled device that transmits a reply signal when receiving the control signal, and a reception unit 102 that receives the reply signal. Further, the control apparatus 100 includes a control unit that calculates a communication delay time from a difference between a transmission time of the control signal and a reception time of the reply signal and changes the predetermined transmission interval in such a way that a sum of the predetermined transmission interval and the communication delay time satisfies a predetermined condition.

By being configured in this way, the control apparatus 100 according to the present example embodiment is capable of setting the sum of the interval for transmitting the control signal and the communication delay time to a value optimal for controlling the to-be-controlled device. Thus, even when the communication delay time is long or the communication delay time is varied, the control apparatus 100 is capable of stably controlling the to-be-controlled device.

Second Example Embodiment

Next, with reference to the drawings, a second example embodiment is described.
[Description of Configuration]

Figure 2:
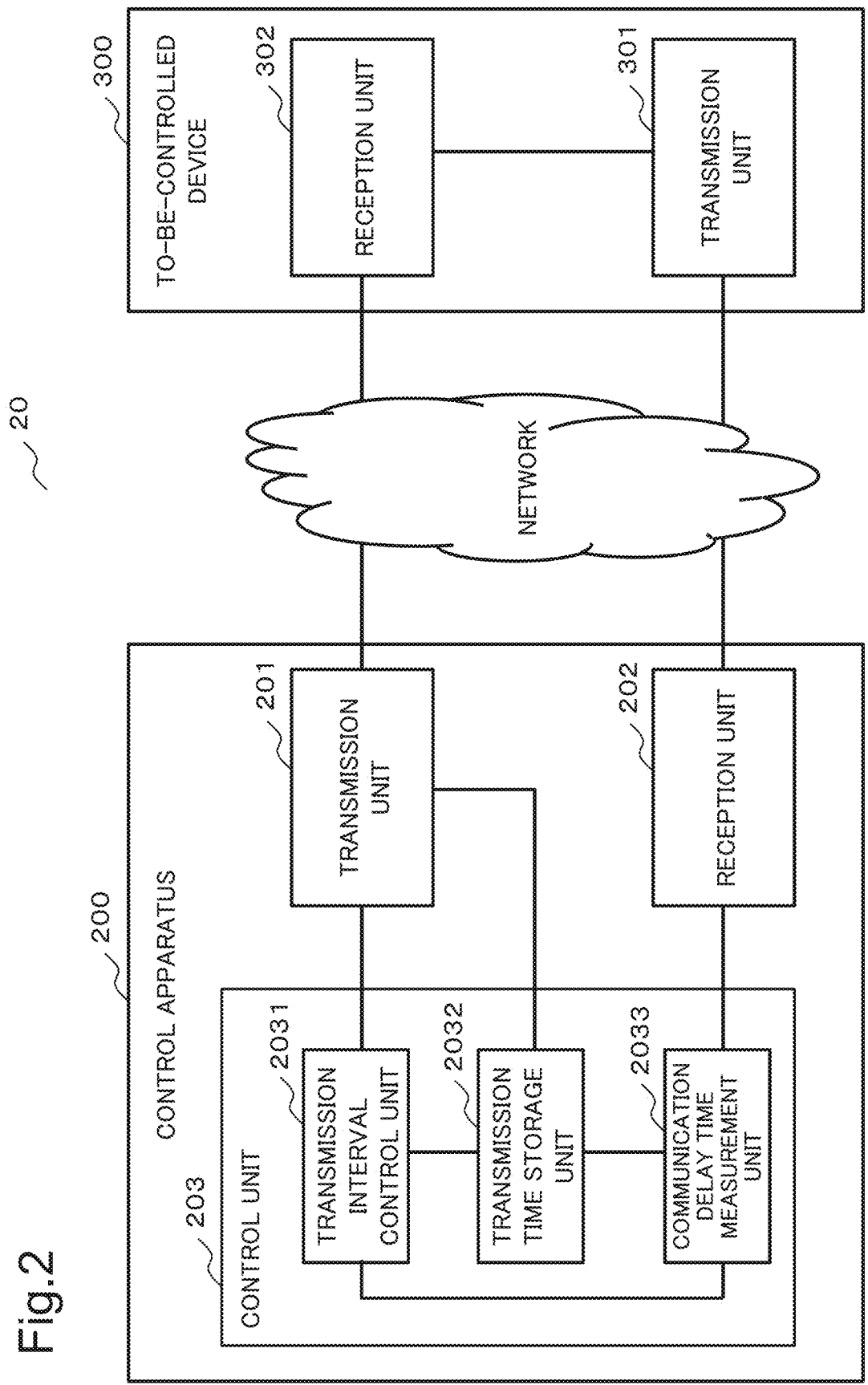
FIG. 2 is a diagram illustrating a configuration example according to a second example embodiment
Figure 3:
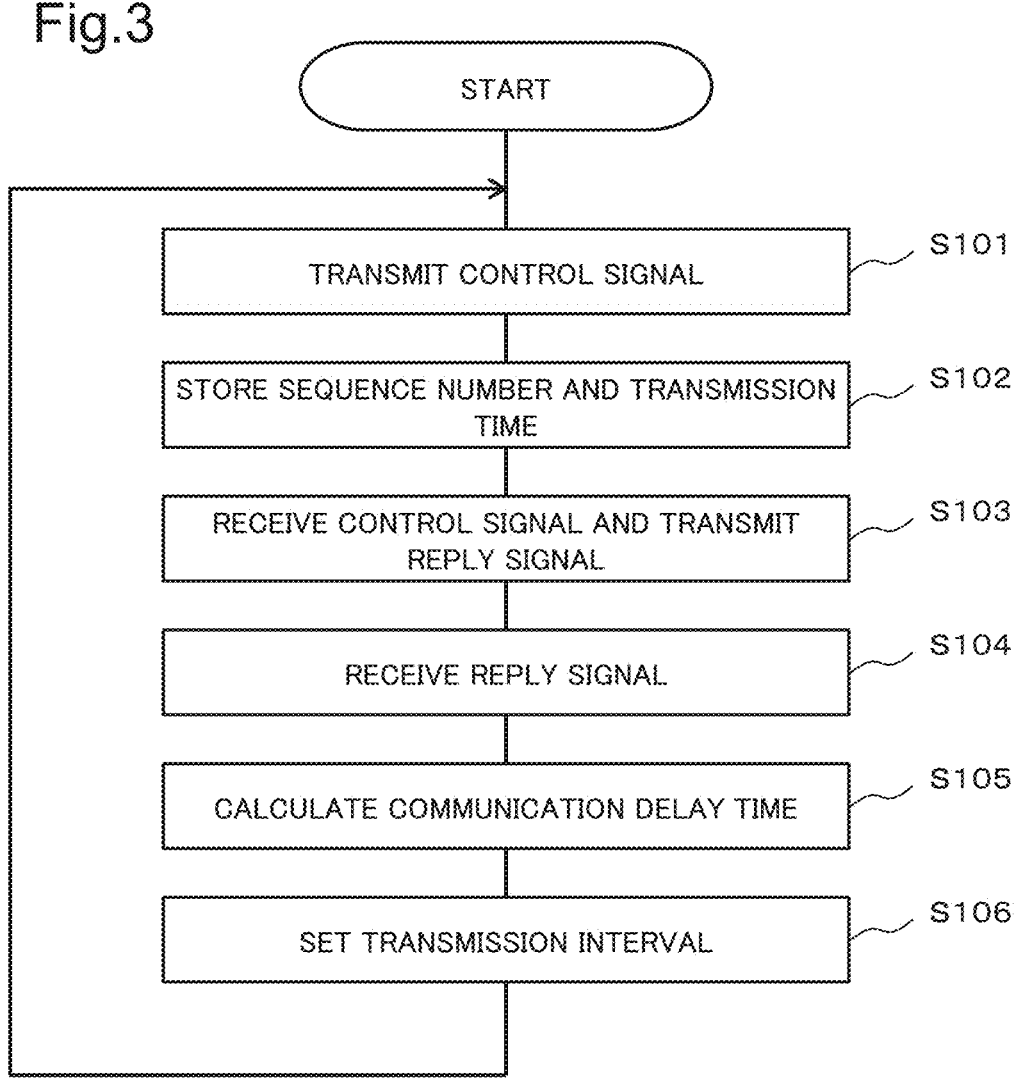
FIG. 3 is a diagram illustrating an operation according to the second example embodiment.

FIG. 2 illustrates a configuration of the second example embodiment.

A control system 20 includes a control apparatus 200 and a to-be-controlled device 300 that are connected to a network such as the Internet. FIG. 2 illustrates one to-be-controlled device 300, but a plurality of to-be-controlled devices 300 may be connected to the network.

The control apparatus 200 includes a transmission unit 201, a reception unit 202, and a control unit 203.

The transmission unit 201 is a transmitter that is connected to the network wirelessly or by wire and transmits a control signal to the to-be-controlled device 300.

The reception unit 202 is a receiver that is connected to the network wirelessly or by wire and receives a reply signal transmitted from the to-be-controlled device 300.

Note that, it is general to provide the transmission unit 201 and the reception unit 202 as one integrated transceiver including one antenna or one signal line connected to the network. Separation between a transmission system and a reception system is achieved by a filter in some cases.

The control unit 203 controls hardware and executes software of the control apparatus 200. The control unit 203 may be formed of a central processing unit (CPU) and a memory. Further, the control unit 203 has functions as a transmission interval control unit 2031, a transmission time storage unit 2032, and a communication delay time measurement unit 2033 that are achieved by the hardware or the software.

The to-be-controlled device 300 includes a transmission unit 301 and a reception unit 302.

The transmission unit 301 is a transmitter that transmits the reply signal indicating a state of the to-be-controlled device 300 when the reception unit 302 receives the control signal. The state of the to-be-controlled device 300 may be posture information, positional information, or the like of the to-be-controlled device 300 to be detected by a sensor, for example.
[Description of Operation]

As described above, when an interval at which the control apparatus 200 transmits the control signal is too short, a communication delay time is increased, and thus control for the to-be-controlled device is delayed and an operation of the to-be-controlled device is unstabilized. Further, while the longer interval for transmitting the control signal leads to the shorter communication delay time, the longer transmission interval delays control for the to-be-controlled device, thereby unstabilizing the operation of the to-be-controlled device.

In order to minimize the interval for controlling the to-be-controlled device under such circumstance, the interval for transmitting the control signal may be set in such a way to minimize a sum of the interval for transmitting the control signal and the communication delay time.

Next, with reference to FIG. 3 to FIG. 6, an operation of the control system 20 according to the present example embodiment is described.

First, the transmission unit 201 in the control apparatus 200 transmits a data packet being the control signal at a time interval instructed by the transmission interval control unit 2031 (S101).

Herein, the transmission interval control unit 2031 prepares a plurality of transmission intervals. The transmission interval directly after starting the operation may be any transmission interval among the prepared transmission intervals, and may be the shortest transmission interval, for example.

Subsequently, the transmission time storage unit 2032 stores an identification code of the data packet being the control signal, for example, a sequence number and a transmission time (S102).

When receiving the control signal, the reception unit 302 in the to-be-controlled device 300 immediately transmits, from the transmission unit 301 to the control apparatus 200, a reply signal including sensor information that the to-be-controlled device has and the identification code of the control signal received by the reception unit 302 (S103).

Herein, the sensor information may be information indicating a posture state such as a tilt of a drone in a case where the to-be-controlled device is a drone.

Subsequently, the reception unit 202 in the control apparatus 200 receives the reply signal (S104).

The communication delay time measurement unit 2033 calculates a difference between a transmission time of the control signal associated with the identification code included in the reply signal received in Step S104 and a reception time of the reply signal, and set the result as the communication delay time (S105).

In Step S106, the transmission interval control unit 2031 sets a transmission interval by a method described later, based on the communication delay time calculated in Step S105 (S106).

After Step S106, the processing returns to Step S101.

The operation of the control system 20 is thus described.

Next, a method by which the transmission interval control unit 2031 sets the transmission interval in Step S106 described above is described.

The transmission interval control unit 2031 prepares a plurality of candidate values for the transmission interval in advance. Any number of candidate values may be selected by any method.

For example, selection may be performed with n×(T1) milliseconds or (T2)+10<n milliseconds, where n is an integer variable of 1 or more. In this case, (T1) and (T2) are positive real numbers set in advance. Herein, an example where the candidate values for the transmission interval are selected as n×(T1) milliseconds is described.

In Step S105, when receiving the reply signal from the to-be-controlled device 300, the reception unit 202 calculates the communication delay time, and transmits the result to the transmission interval control unit 2031.

In Step S106, when the reception unit 202 receives a reply packet a plurality of times, the transmission interval control unit 2031 can determine how much communication delay time occurs in the communication at the shortest. The transmission interval control unit 2031 holds, as a reference value, a value acquired by approximately doubling the resultant value. Further, when the reply signal associated with the control signal during a process of transmission is not received for more than the reference value, n is increased. In contrast, when a state in which the communication delay time exceeds the reference value is cancelled, n is reduced.

Figure 4:
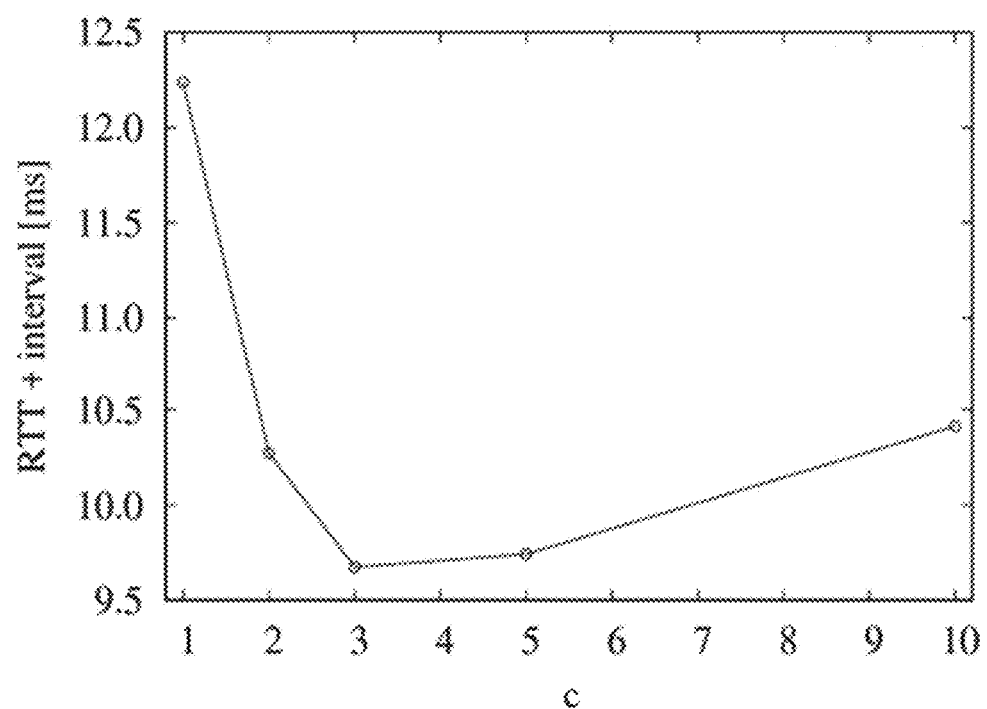
FIG. 4 is a diagram illustrating the operation according to the second example embodiment.

An applied example indicating effectiveness of this method is illustrated in FIG. 4.

FIG. 4 illustrates, as a function of c, an average value of the sum of the communication delay time and the transmission interval in a case where, assuming (T1)=2.5 milliseconds, communication is performed by switching between two transmission interval candidate values of n=1 and n=c. Herein, when c=1 is satisfied, substantially, only one transmission interval candidate value is present, which is equivalent to a case where a control command is transmitted at a constant transmission interval without using the apparatus.

It is important for the graph in FIG. 4 to have a minimum value.

First, as compared to c=1, a value satisfying c>1 is set, that is, the communication delay time is suppressed by increasing the transmission interval, and the sum of the transmission interval and the communication delay time is reduced.

Meanwhile, when c is set to an excessively large value, the transmission interval is increased more than necessary, which causes the sum of the transmission interval and the communication delay time to be increased.

In other words, there is such optimal value c that the sum of the transmission interval and the communication delay time is minimized. However, the value fluctuates depending on a communication environment, and is varied over time even between the same control apparatus and the same to-be-controlled device. Thus, it is difficult to determine the optimal value c in advance.

Next, one example of a method of setting the optimal value c is described.

First, description is made on a criterion for selecting one from two candidates for the value c, which is more suitable for reducing the sum of the transmission interval and the communication delay time.

Figure 5:
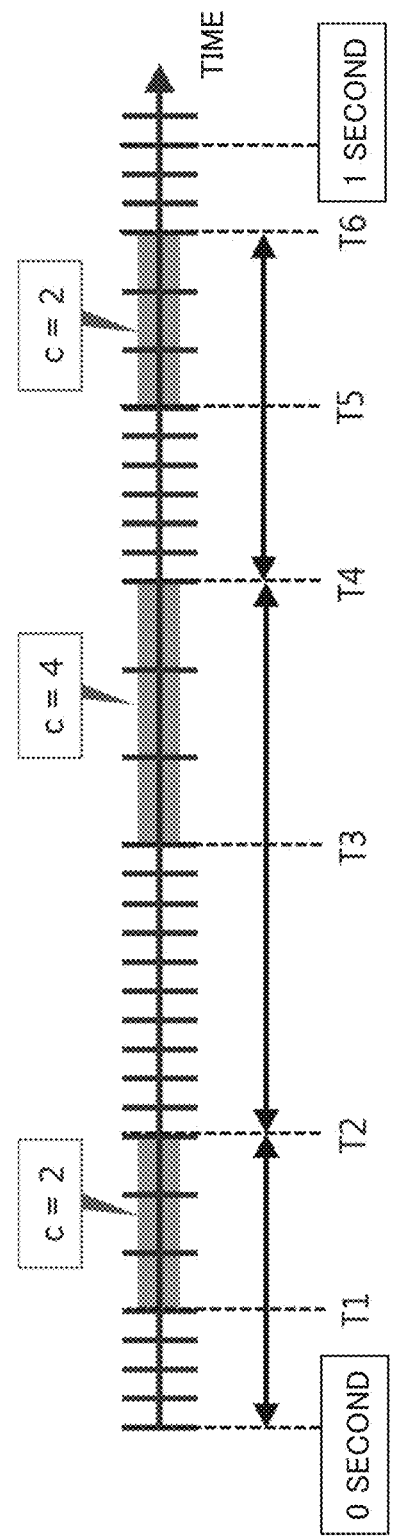
FIG. 5 is a diagram illustrating the operation according to the second example embodiment.
Figure 6:
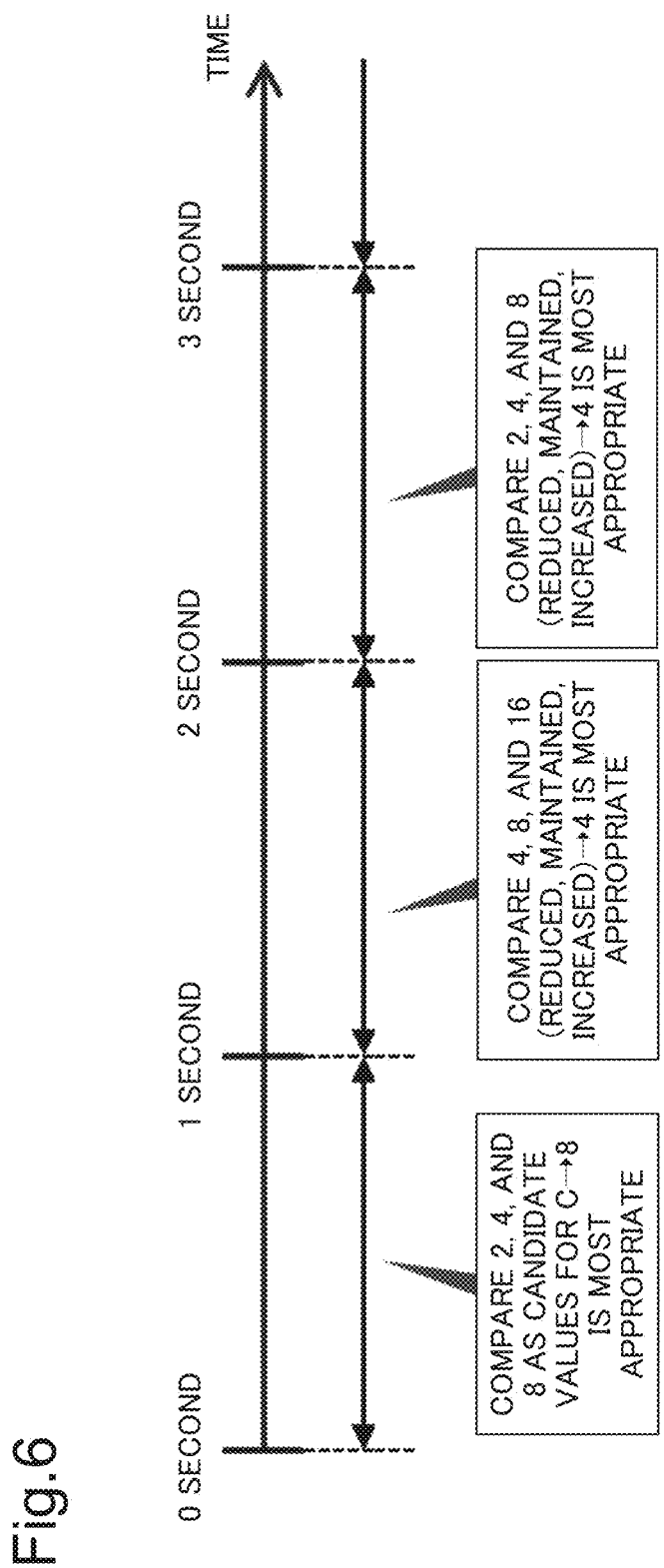
FIG. 6 is a diagram illustrating the operation according to the second example embodiment.

For example, it is assumed that the two candidate values for the value c are 2 and 4. As illustrated in FIG. 5, it is assumed that transmission is started from a time of 0 seconds with n=1.

At a time (T1), the communication delay time exceeds a delay reference value, and hence n>1 is determined, and "2" being a smaller one of the candidate values is selected in this case.

At a time (T2), the communication delay time falls below the delay reference value, and transmission is performed with n=1 again.

When the delay reference value is exceeded at a time (T3), the one different from the candidate value selected previously is selected, and n=4 is satisfied.

After n=1 is satisfied at a time (T4), the one different from the candidate value selected previously is selected at a time (T5), and n=2 is satisfied.

This is repeated until one second elapses, for example.

After one second elapses, with respect to a total time from the time 0 to the time (T2) and from the time (T4) to the time (T6), an average value A of the sum of the transmission interval and the communication delay time is calculated.

Simultaneously, with respect to a time from the time (T2) to the time (T4), an average value B of the sum of the transmission interval and the communication delay time is calculated. When the average value A is smaller than the average value B, c=2 is selected as a value optimal for the transmission interval. When the average value B is smaller than the average value A, c=4 is selected as a value optimal for the transmission interval.

This selection method can be easily extended to equal to or more than three candidate values for c.

For example, in a case where the number of candidate values for c is three (for example, c1, c2, and c3), when selection for satisfying n>1 described above is performed, it is only required to successively perform selection for c1, c2, and c3. Then, after a certain time elapses, such candidate value for c that the average value of the sum of the transmission interval and the communication delay time is minimized is selected.

An example of selecting a candidate value optimal for c in accordance with the method described above is described with reference to FIG. 6.

First, when transmission is started, the transmission interval control unit 2031 selects approximately three candidates value for c. Those candidates values are desirably smaller. In the example of FIGS. 5, 2, 4, and 8 are set.

Further, communication for one-second control is performed, and a candidate value optimal for c is selected by the method described above. For subsequent one to two seconds, one smaller value and one larger value are selected with reference to the candidate value optimal for c selected previously. Based on those three candidate values, control communication is successively performed. By repeating this, such value for c that the sum of the transmission interval and the communication delay time is stochastically reduced is selected.

As described above, the control system 20 and the control apparatus 200 according to the present example embodiment are capable of setting the sum of the interval for transmitting a control signal and the communication delay time to a value optimal for control for the to-be-controlled device 300. Thus, even when the communication delay time is long or the communication delay time is varied, the control system 20 and the control apparatus 200 are capable of stably controlling the to-be-controlled device 300.

Third Example Embodiment

Figure 7:
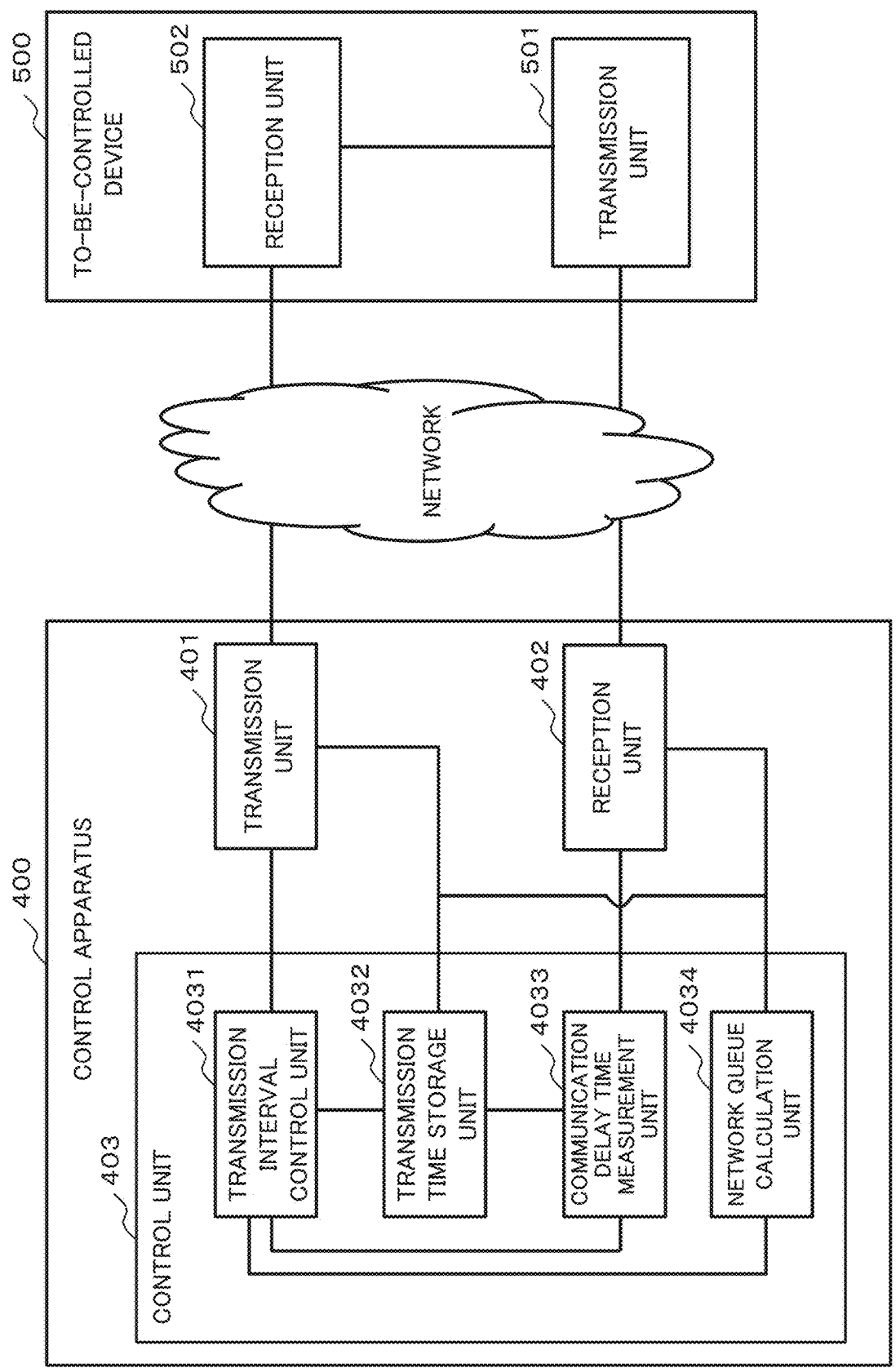
FIG. 7 is a diagram illustrating a configuration example according to a third example embodiment.

Next, with reference to FIG. 7, a third example embodiment is described.
[Description of Configuration]
FIG. 7 illustrates a configuration of the third example embodiment.

In a control system 30, the control apparatus 200 according to the second example embodiment is replaced with a control apparatus 400. An operation of a to-be-controlled device 500 is the same as the operation of the to-be-controlled device 300 according to the second example embodiment.

A control unit 403 in the control apparatus 400 includes a network queue calculation unit 4034 in addition to the configuration of the control unit 203 in the control apparatus 200 described according to the second example embodiment.

The network queue calculation unit 4034 calculates a difference between a sequence number included in the latest data packet transmitted by the transmission unit and a sequence number included in the latest reception packet.
[Description of Operation]
According to the second example embodiment, switching between n=1 and n>1 is performed based on a magnitude correlation between the communication delay time and the delay reference value.

However, as in the present example embodiment, switching of n may be performed based on the number of packets queued on a network.

The difference between the sequence numbers calculated by the network queue calculation unit 4034 indicates the number of packets queued on the network, that is, the number of packets retaining on the network.

When the difference between the sequence numbers calculated by the network queue calculation unit 4034 exceeds a threshold value set in advance, n>1 may be selected.

In this manner, similarly to the second example embodiment, the control system 30 and the control apparatus 400 are also capable of setting the sum of the interval for transmitting a control signal and the communication delay time to a value optimal for control for the to-be-controlled device 500. Thus, when the communication delay time is long or the communication delay time is varied, the control system 30 and the control apparatus 400 are capable of stably controlling the to-be-controlled device 500.

Fourth Example Embodiment

Figure 8:
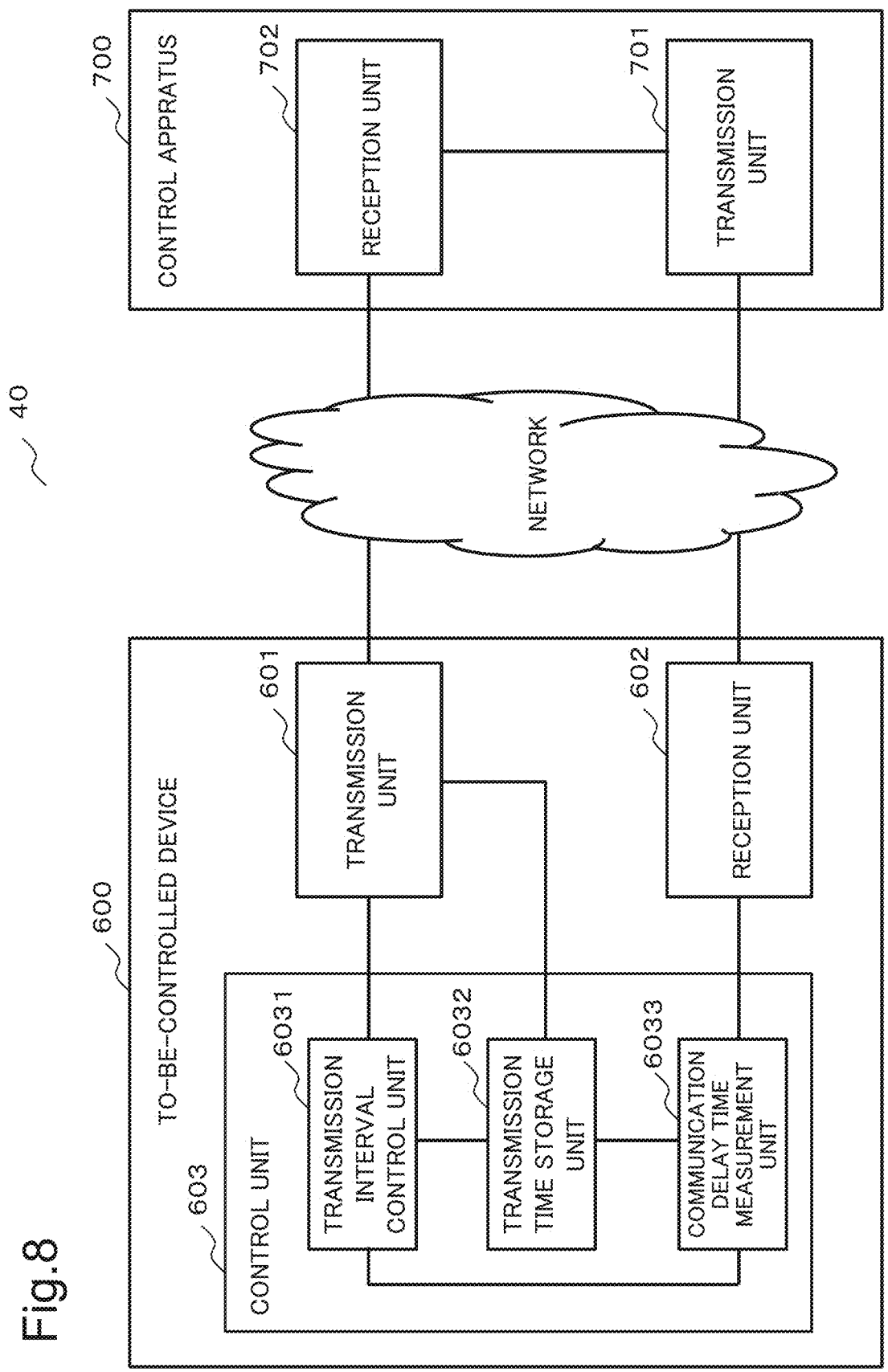
FIG. 8 is a diagram illustrating a configuration example according to a fourth example embodiment.

Next, with reference to FIG. 8, a fourth example embodiment is described.
[Description of Configuration]
FIG. 8 illustrates a configuration of the fourth example embodiment.

When FIG. 8 is compared with FIG. 2 illustrating the configuration of the second example embodiment, the configurations of the control device and the to-be-controlled device are reversed.

In the control system according to the second example embodiment, the control apparatus transmits a control signal, the to-be-controlled device performs a certain operation, and the to-be-controlled device transmits a reply signal to the control apparatus.

However, in a control system 40 according to the present example embodiment, a case where a to-be-controlled device 600 transmits a reply signal such as own sensor information to a control apparatus 700 almost in real time at a short interval, for example, at a several milliseconds is assumed. When receiving the reply signal from the to-be-controlled device 600, the control apparatus 700 transmits an appropriate control signal depending on the content of the reply signal to the to-be-controlled device 600.

In such case, as illustrated in FIG. 8, a transmission interval control unit 6031 is incorporated in the to-be-controlled device 600, and thus control performance can be improved.

According to the present example embodiment, a transmission unit 601 transmits a sequence number of a transmission data packet of the reply signal and the sensor information to the control apparatus 700. When receiving the reply signal, the control apparatus 700 transmits a control signal provided with the same sequence number as that of the reply signal to the to-be-controlled device 600.

In this manner, even when the to-be-controlled device 600 is capable of transmitting the reply signal frequently, the control system 40 and the to-be-controlled device 600 are capable of setting a sum of an interval for transmitting the reply signal and a communication delay time to a value optimal for control for the to-be-controlled device 500. Thus, even when the communication delay time is long or the communication delay time is varied, the control system 40 and the to-be-controlled device 600 are capable of stably controlling the to-be-controlled device 600.

The preferred example embodiments of the present invention are described above. However, the present invention is not limited to the example embodiments, and the following extension and modification can be made.

According to the fourth example embodiment, a configuration in which, when the to-be-controlled device 600 is capable of transmitting the reply signal frequently, the control system 40 and the to-be-controlled device 600 set the sum of the interval for transmitting the reply signal and the communication delay time to a value optimal for control for the to-be-controlled device 500 is exemplified.

Further, according to the third example embodiment, switching of n between n=1 and n>1 is performed, based on the number of packets queued on the network.

Figure 9:
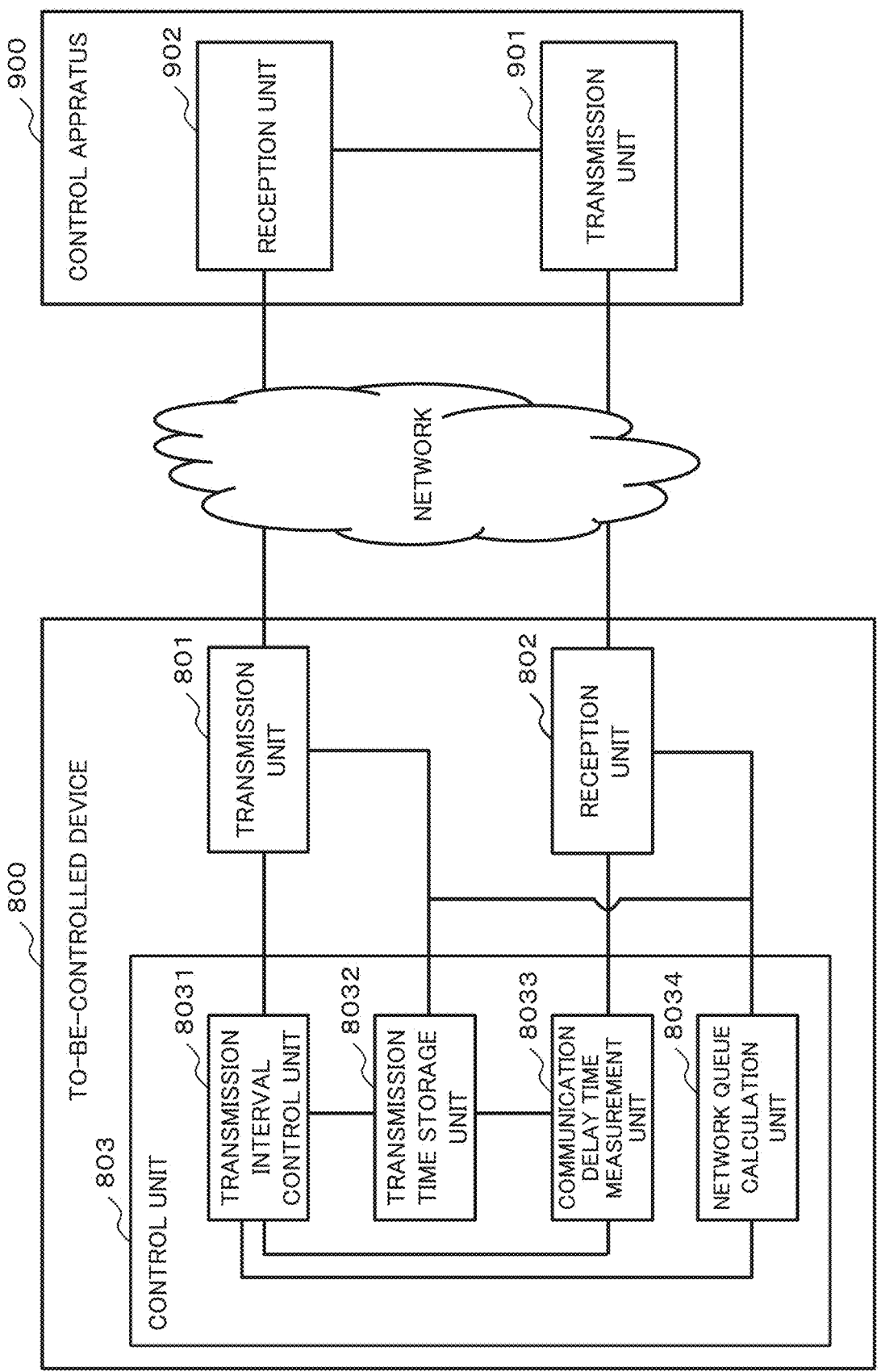
FIG. 9 is a diagram illustrating a modification example according to the fourth example embodiment.

In view of this, as in the configuration illustrated in FIG. 9, it is possible to apply the configuration of the third example embodiment to the configuration of the fourth example embodiment. In other words, when the to-be-controlled device 600 is capable of transmitting the reply signal frequently, switching of n between n=1 and n>1 can be performed based on the number of packets queued on the network.

In this manner, similarly to the fourth example embodiment, a control system 50 and a to-be-controlled device 800 are also capable of stably controlling the to-be-controlled device 800 even when the communication delay time is long or the communication delay time is varied.

Further, the present invention is applicable to a case where an information processing program for achieving the functions of the example embodiments is supplied directly or remotely to the system or the apparatus.

Description is made on a configuration example of a hardware resource of achieving the control apparatus according to the first example embodiment to the third example embodiment of the present invention or the to-be-controlled device according to the fourth example embodiment that are described above through use of one calculation processing device (information processing device, computer). However, the control apparatus or the to-be-controlled device may be achieved through use of at least two calculation processing devices physically or functionally. Further, the control apparatus or the to-be-controlled device may be achieved as dedicated devices.

Figure 10:
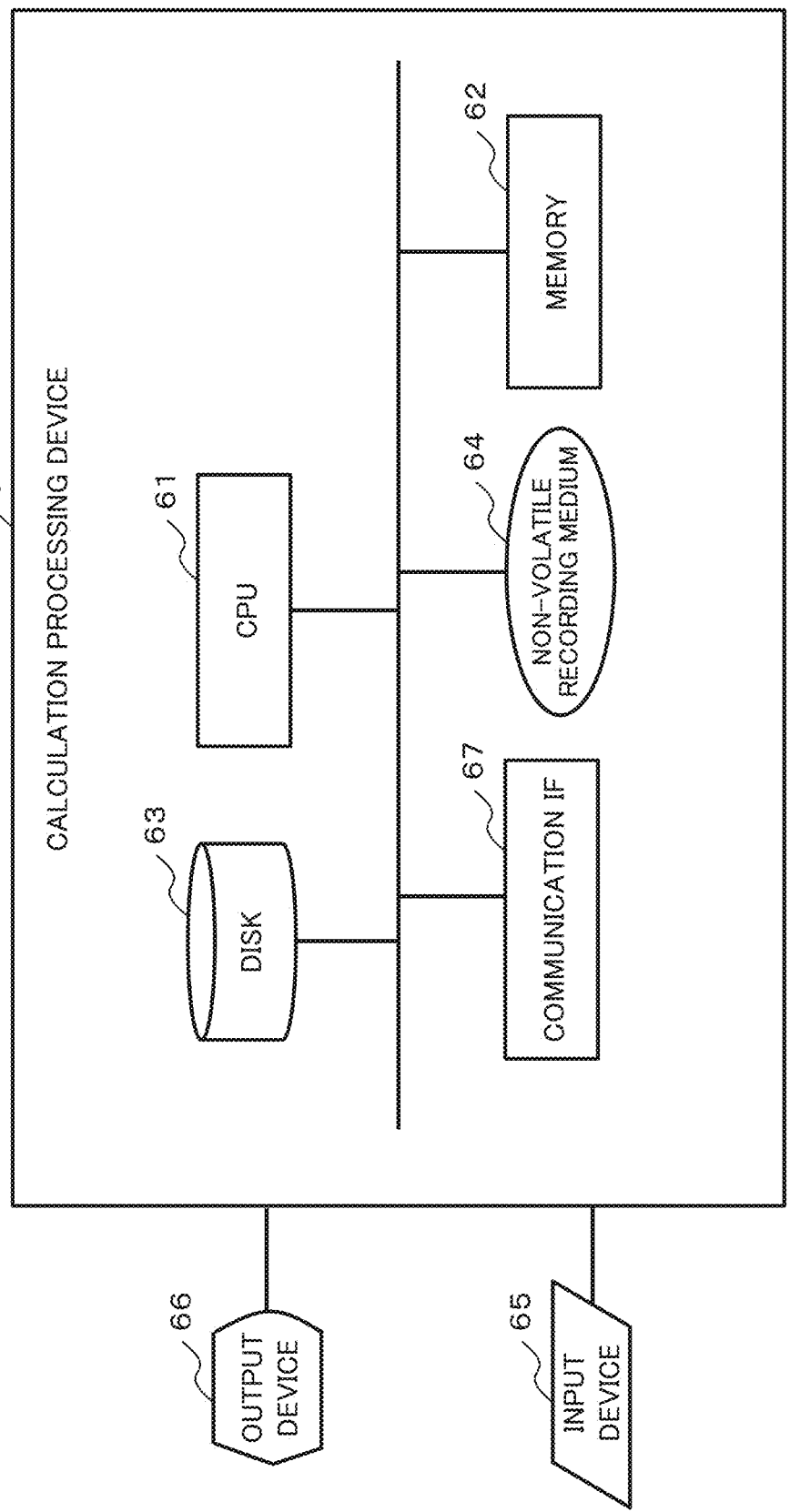
FIG. 10 is a diagram illustrating a hardware configuration example of a calculation processing device capable of achieving a control apparatus or a to-be-controlled device according to each example embodiment.
Figure 11:
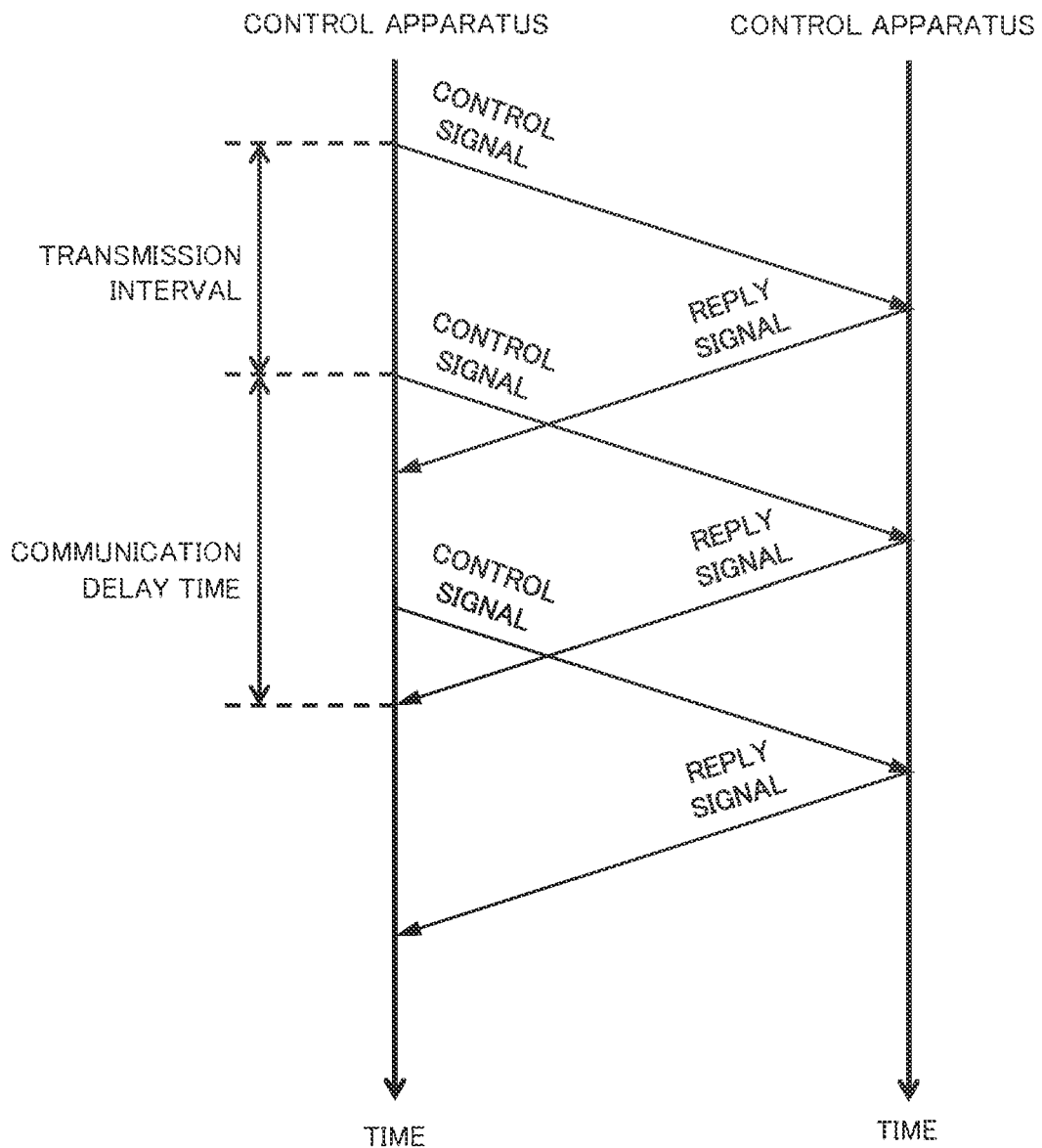
FIG. 11 is a diagram illustrated the related art.

FIG. 10 is a block diagram schematically illustrating a hardware configuration example of a calculation processing device capable of achieving the control apparatus according to the first example embodiment to the third example embodiment of the present invention or the to-be-controlled device according to the fourth example embodiment. A calculation processing device 60 includes a central processing unit (hereinafter, referred to as "CPU") 61, a memory 62, a disc 63, a non-volatile recording medium 64, and a communication interface (hereinafter, referred to as "communication IF") 67. The calculation processing device 60 may be connectable to an input device 65 and an output device 66. The calculation processing device 60 is capable of transmitting and receiving information with other calculation processing devices and communication devices via the communication IF 67.

The non-volatile recording medium 64 is a computer-readable compact disc or digital versatile disc. Further, the non-volatile recording medium 64 may be a universal serial bus memory (USB memory), a solid state drive, or the like. The non-volatile recording medium 64 retains the program without supplying a power source, and enables portability. The non-volatile recording medium 64 is not limited to the media described above. Further, in place of the non-volatile recording medium 64, the program may be transported via the communication IF 67 and the communication network.

That is, when executing a software program (a computer program; hereinafter, simply referred to as "program") stored in the disc 63, the CPU 61 duplicates the program in the memory 62, and executes arithmetic processing. The CPU 61 reads data required for program execution from the memory 62. When display is required, the CPU 61 displays an output result on the output device 66. When the program is input from the outside, the CPU 61 reads the program from the input device 65. The CPU 61 interprets and executes the program in the memory 62, which is associated with the function (processing) indicated by each of the units illustrated in FIG. 1, FIG. 2, and FIG. 7 to FIG. 9 described above. The CPU 61 sequentially executes the processing described in each of the example embodiments of the present invention described above.

That is, in such case, it can be understood that each of the example embodiments of the present invention can also be achieved with the program. Further, it can be understood that each of the example embodiments of the present invention can also be achieved with a computer-readable non-volatile recording medium in which the parameter program is recorded.

The whole or part of the example embodiments disclosed above can be described as, but not limited to, the following supplementary notes.

(Supplementary Note 1)

A control apparatus including:

a transmission means for transmitting a control signal at a predetermined transmission interval to a to-be-controlled device that transmits a reply signal when receiving the control signal;

a reception means for receiving the reply signal; and a control means for calculating a communication delay time from a difference between a transmission time of the control signal and a reception time of the reply signal and changing the predetermined transmission interval in such a way that a sum of the predetermined transmission interval and the communication delay time satisfies a predetermined condition.

(Supplementary Note 2)

The control apparatus according to supplementary note 1, wherein the control signal is a communication packet each provided with a first identifier, the reply signal is a communication packet provided with a second identifier associated with each first identifier, the transmission time of the control signal is the transmission time of the control signal provided with the first identifier, and the reception time of the reply signal is a reception time of the reply signal provided with the second identifier associated with the first identifier.

(Supplementary Note 3)

The control apparatus according to supplementary note 1 or 2, wherein the control apparatus stores a plurality of the predetermined transmission intervals, and the control means sequentially transmits the control signal from the transmission means at at least two of the predetermined transmission intervals among the plurality of the predetermined transmission intervals, and sets the predetermined transmission interval in such a way that a sum of the predetermined transmission interval and the communication delay time satisfies the predetermined condition.

(Supplementary Note 4)

The control apparatus according to any one of supplementary notes 1 to 3, wherein the predetermined condition is to reduce a sum of the predetermined transmission interval and the communication delay time.

(Supplementary Note 5)

The control apparatus according to supplementary note 4, wherein the predetermined condition further indicates that the predetermined transmission interval and the communication delay time exceeds a predetermined reference value.

(Supplementary Note 6)

The control apparatus according to any one of supplementary notes 3 to 5, wherein the plurality of the predetermined transmission intervals are updated regularly or irregularly, and at every time of the update, the control means performs the setting of the predetermined transmission interval.

(Supplementary Note 7)

A control apparatus including:

a transmission means for transmitting a control signal at a predetermined transmission interval to a to-be-controlled device that transmits a reply signal when receiving the control signal;

a reception means for receiving the reply signal; and a control means for changing the predetermined transmission interval in such a way that a difference between a sequence number provided for the latest control signal transmitted from the transmission means and the sequence number provided for the latest reply signal received by the reception means satisfies a predetermined condition.

(Supplementary Note 8)

The control apparatus according to supplementary note 7, wherein the control apparatus stores a plurality of the predetermined transmission intervals, the control means sequentially transmits the control signal from the transmission means at at least two of the predetermined transmission intervals among the plurality of the predetermined transmission intervals, and sets the predetermined transmission interval in such a way that the difference between the sequence number provided for the latest control signal transmitted from the transmission means and the sequence number provided for the latest reply signal received by the reception means satisfies the predetermined condition.

(Supplementary Note 9)

The control apparatus according to supplementary note 7 or 8, wherein the predetermined condition indicates that the difference between the sequence number provided for the latest control signal transmitted from the transmission means and the sequence number provided foe the latest reply signal received by the reception means is small.

(Supplementary Note 10)

The control apparatus according to supplementary note 9, wherein the predetermined condition further indicates that the difference between the sequence number provided for the latest control signal transmitted from the transmission means and the sequence number provided for the latest reply signal received by the reception means exceeds a predetermined reference value.

(Supplementary Note 11)

The control apparatus according to any one of supplementary notes 8 to 10, wherein the plurality of the predetermined transmission intervals are updated regularly or irregularly, and at every time of the update, the control means performs the setting of the predetermined transmission interval.

(Supplementary Note 12)

A to-be-controlled device including:

a transmission means for transmitting a reply signal at a predetermined transmission interval to a control apparatus that transmits a control signal when receiving the reply signal;

a reception means for receiving the control signal; and a control means for calculating a communication delay time from a difference between a transmission time of the reply signal and a reception time of the control signal, and changing the predetermined transmission interval in such a way that a sum of the predetermined transmission interval and the communication delay time satisfies a predetermined condition.

(Supplementary Note 13)

The to-be-controlled device according to supplementary note 12, wherein the reply signal is a communication packet each provided with a first identifier, the control signal is a communication packet provided with a second identifier associated with each first identifier, the transmission time of the reply signal is the transmission time of the reply signal provided with the first identifier, and the reception time of the control signal is a reception time of the control signal provided with the second identifier associated with the first identifier.

(Supplementary Note 14)

The to-be-controlled device according to supplementary note 12 or 13, wherein the to-be-controlled device stores a plurality of the predetermined transmission intervals, the control means sequentially transmits the reply signal from the transmission means at at least two of the predetermined transmission intervals among the plurality of the predetermined transmission intervals, and sets the predetermined transmission interval in such a way that a sum of the predetermined transmission interval and the communication delay time satisfies the predetermined condition.

(Supplementary Note 15)

The to-be-controlled device according to any one of supplementary notes 12 to 14, wherein the predetermined condition is to reduce a sum of the predetermined transmission interval and the communication delay time.

(Supplementary Note 16)

The to-be-controlled device according to supplementary note 15, wherein the predetermined condition further indicates that the predetermined transmission interval and the communication delay time exceed a predetermined reference value.

(Supplementary Note 17)

The to-be-controlled device according to any one of supplementary notes 14 to 16, wherein the plurality of the predetermined transmission intervals are updated regularly or irregularly, and at every time of the update, the control means performs the setting of the predetermined transmission interval.

(Supplementary Note 18)

A to-be-controlled device including:

a transmission means for transmitting a reply signal at a predetermined transmission interval to a control apparatus that transmits a control signal when receiving the reply signal;

a reception means for receiving the control signal; and a control means for changing the predetermined transmission interval in such a way that a difference between a sequence number provided for the latest reply signal transmitted from the transmission means and the sequence number provided for the latest control signal received by the reception means satisfies a predetermined condition.

(Supplementary Note 19)

The to-be-controlled device according to supplementary note 18, wherein the to-be-controlled device stores a plurality of the predetermined transmission intervals, and the control means sequentially transmits the reply signal from the transmission means at at least two of the predetermined transmission intervals among the plurality of the predetermined transmission intervals, and sets the predetermined transmission interval in such a way that the difference between the sequence number provided for the latest reply signal transmitted from the transmission means and the sequence number provided for the latest control signal received by the reception means satisfies the predetermined condition.

(Supplementary Note 20)

The to-be-controlled device according to supplementary note 18 or 19, wherein the predetermined condition indicates that the difference between the sequence number provided for the latest reply signal transmitted from the transmission means and the sequence number provided for the latest control signal received by the reception means is small.

(Supplementary Note 21)

The to-be-controlled device according to supplementary note 20, wherein the predetermined condition further indicates that the difference between the sequence number provided for the latest reply signal transmitted from the transmission means and the sequence number provided for the latest control signal received by the reception means exceeds a predetermined reference value.

(Supplementary Note 22)

The to-be-controlled device according to any one of supplementary notes 19 to 21, wherein the plurality of the predetermined transmission intervals are updated regularly or irregularly, and at every time of the update, the control means performs the setting of the predetermined transmission interval.

(Supplementary Note 23)

A control system including:

the control apparatus according to any one of supplementary notes 1 to 11; and at least one of the to-be-controlled devices, wherein the control apparatus and the at least one of the to-be-controlled devices are connected to a network.

(Supplementary Note 24)

A control system including:

at least one of the to-be-controlled devices according to any one of supplementary notes 12 to 22; and the control apparatus, wherein the control apparatus and the at least one of the to-be-controlled devices are connected to a network.

(Supplementary Note 25)

A control method including:

transmitting a control signal at a predetermined transmission interval to a to-be-controlled device that transmits a reply signal when receiving the control signal:

receiving the reply signal; and calculating a communication delay time from a difference between a transmission time of the control signal and a reception time of the reply signal and changing the predetermined transmission interval in such a way that a sum of the predetermined transmission interval and the communication delay time satisfies a predetermined condition.

(Supplementary Note 26)

The control method according to supplementary note 25, wherein the control signal is a communication packet each provided with a first identifier, the reply signal is a communication packet provided with a second identifier associated with each first identifier, the transmission time of the control signal is the transmission time of the control signal provided with the first identifier, and the reception time of the reply signal is a reception time of the reply signal provided with the second identifier associated with the first identifier.

(Supplementary Note 27)

The control method according to supplementary note 25 or 26, further comprising sequentially transmitting the control signal at at least two of the predetermined transmission intervals among a plurality of predetermined transmission intervals, and setting the predetermined transmission interval in such a way that a sum of the predetermined transmission interval and the communication delay time satisfies the predetermined condition.

(Supplementary Note 28)

The control method according to any one of supplementary notes 25 to 27, wherein the predetermined condition is to reduce a sum of the predetermined transmission interval and the communication delay time.

(Supplementary Note 29)

The control method according to supplementary note 28, wherein the predetermined condition further indicates that the predetermined transmission interval and the communication delay time exceed a predetermined reference value.

(Supplementary Note 30)

The control method according to any one of supplementary notes 27 to 29, wherein the plurality of the predetermined transmission intervals are updated regularly or irregularly, and, at every time of the update, the setting of the predetermined transmission interval is performed.

(Supplementary Note 31)

A control method including:

transmitting a control signal at a predetermined transmission interval to a to-be-controlled device that transmits a reply signal when receiving the control signal:

receiving the reply signal; and changing the predetermined transmission interval in such a way that a difference between a sequence number provided for the latest transmitted control signal and the sequence number provided for the latest received reply signal satisfies a predetermined condition.

(Supplementary Note 32)

The control method according to supplementary note 31, further comprising sequentially transmitting the control signal at at least two of the predetermined transmission intervals among a plurality of the predetermined transmission intervals, and setting the predetermined transmission interval in such a way that the difference between the sequence number provided for the latest transmitted control signal and the sequence number provided for the latest received reply signal satisfies the predetermined condition.

(Supplementary Note 33)

The control method according to supplementary note 31 or 32, wherein the predetermined condition indicates that the difference between the sequence number provided for the latest transmitted control signal and the sequence number provided for the latest received reply signal is small.

(Supplementary Note 34)

The control method according to supplementary note 33, wherein the predetermined condition further indicates that the difference between the sequence number provided for the latest transmitted control signal and the sequence number provided for the latest received reply signal exceeds a predetermined reference value.

(Supplementary Note 35)

The control method according to any one of supplementary notes 32 to 34, wherein the plurality of the predetermined transmission intervals are updated regularly or irregularly, and, at every time of the update, the setting of the predetermined transmission interval is performed.

(Supplementary Note 36)

A control method of a to-be-controlled device including:

transmitting a reply signal at a predetermined transmission interval to a control apparatus that transmits a control signal when receiving the reply signal;

receiving the control signal; and calculating a communication delay time from a difference between a transmission time of the reply signal and a reception time of the control signal, and changing the predetermined transmission interval in such a way that a sum of the predetermined transmission interval and the communication delay time satisfies a predetermined condition.

(Supplementary Note 37)

The control method of the to-be-controlled device according to supplementary note 36, wherein the reply signal is a communication packet each provided with a first identifier, the control signal is a communication packet provided with a second identifier associated with each first identifier, the transmission time of the reply signal is the transmission time of the reply signal provided with the first identifier, and the reception time of the control signal is a reception time of the control signal provided with the second identifier associated with the first identifier.

(Supplementary Note 38)

The control method of the to-be-controlled device according to supplementary note 36 or 37, further comprising sequentially transmitting the reply signal at at least two of the predetermined transmission intervals among a plurality of the predetermined transmission intervals, and setting the predetermined transmission interval in such a way that a sum of the predetermined transmission interval and the communication delay time satisfies the predetermined condition.

(Supplementary Note 39)

The control method of the to-be-controlled device according to any one of supplementary notes 36 to 38, wherein the predetermined condition is to reduce a sum of the predetermined transmission interval and the communication delay time.

(Supplementary Note 40)

The control method of the to-be-controlled device according to supplementary note 39, wherein the predetermined condition further indicates that the predetermined transmission interval and the communication delay time exceed a predetermined reference value.

(Supplementary Note 41)

The control method of the to-be-controlled device according to any one of supplementary notes 38 to 40, wherein the plurality of the predetermined transmission intervals are updated regularly or irregularly, and at every time of the update, the setting of the predetermined transmission interval is performed.

(Supplementary Note 42)

A control method of a to-be-controlled device including:

transmitting a reply signal at a predetermined transmission interval to a control apparatus that transmits a control signal when receiving the reply signal;

receiving the control signal; and changing the predetermined transmission interval in such a way that a difference between a sequence number provided for the latest transmitted reply signal and the sequence number provided for the latest received control signal satisfies a predetermined condition.

(Supplementary Note 43)

The control method of the to-be-controlled device according to supplementary note 42, further comprising sequentially transmitting the reply signal at at least two of the predetermined transmission intervals among a plurality of the predetermined transmission intervals, and setting the predetermined transmission interval in such a way that the difference between the sequence number provided for the latest transmitted reply signal and the sequence number provided for the latest received control signal satisfies the predetermined condition.

(Supplementary Note 44)

The control method of the to-be-controlled device according to supplementary note 42 or 43, wherein the predetermined condition indicates that the difference between the sequence number provided for the latest transmitted reply signal and the sequence number provided for the latest received control signal is small.

(Supplementary Note 45)

The control method of the to-be-controlled device according to supplementary note 44, wherein the predetermined condition indicates that the difference between the sequence number provided for the latest transmitted reply signal and the sequence number provided for the latest received control signal exceeds a predetermined reference value.

(Supplementary Note 46)

The control method of the to-be-controlled device according to any one of supplementary notes 43 to 45, wherein the plurality of the predetermined transmission intervals are updated regularly or irregularly, and, at every time of the update, the setting of the predetermined transmission interval is performed.

(Supplementary Note 47)

A program for a control apparatus, the program causing a computer to execute:

transmitting a control signal at a predetermined transmission interval to a to-be-controlled device that transmits a reply signal when receiving the control signal;

receiving the reply signal; and calculating a communication delay time from a difference between a transmission time of the control signal and a reception time of the reply signal and changing the predetermined transmission interval in such a way that a sum of the predetermined transmission interval and the communication delay time satisfies a predetermined condition.

(Supplementary Note 48)

The program for the control apparatus according to supplementary note 45, wherein the control signal is a communication packet each provided with a first identifier, the reply signal is a communication packet provided with a second identifier associated with each first identifier, the transmission time of the control signal is the transmission time of the control signal provided with the first identifier, and the reception time of the reply signal is a reception time of the reply signal provided with the second identifier associated with the first identifier.

(Supplementary Note 49)

The program for the control apparatus according to supplementary note 47 or 48, wherein the control signal is sequentially transmitted at at least two of the predetermined transmission intervals among a plurality of predetermined transmission intervals, and the predetermined transmission interval is set in such a way that a sum of the predetermined transmission interval and the communication delay time satisfies the predetermined condition.

(Supplementary Note 50)

The program for the control apparatus according to any one of supplementary notes 47 to 49, wherein the predetermined condition is to reduce a sum of the predetermined transmission interval and the communication delay time.

(Supplementary Note 51)

The program for the control apparatus according to supplementary note 50, wherein the predetermined condition further indicates that the predetermined transmission interval and the communication delay time exceed a predetermined reference value.

(Supplementary Note 52)

The program for the control apparatus according to any one of supplementary notes 49 to 51, wherein the plurality of the predetermined transmission intervals are updated regularly or irregularly, and, at every time of the update, the setting of the predetermined transmission interval is performed.

(Supplementary Note 53)

A program for a control apparatus, the program causing a computer to execute:

transmitting a control signal at a predetermined transmission interval to a to-be-controlled device that transmits a reply signal when receiving the control signal:

receiving the reply signal; and changing the predetermined transmission interval in such a way that a difference between a sequence number provided for the latest transmitted control signal and the sequence number provided for the latest received reply signal satisfies a predetermined condition.

(Supplementary Note 54)

The program for the control apparatus according to supplementary note 53, wherein the control signal is sequentially transmitted at at least two of the predetermined transmission intervals among a plurality of the predetermined transmission intervals, and the predetermined transmission interval is set in such a way that the difference between the sequence number provided for the latest transmitted control signal and the sequence number provided for the latest received reply signal satisfies the predetermined condition.

(Supplementary Note 55)

The program for the control apparatus according to supplementary note 53 or 54, wherein the predetermined condition indicates that the difference between the sequence number provided for the latest transmitted control signal and the sequence number provided for the latest received reply signal is small.

(Supplementary Note 56)

The program for the control apparatus according to supplementary note 55, wherein the predetermined condition further indicates that the difference between the sequence number provided for the latest transmitted control signal and the sequence number provided for the latest received reply signal exceeds a predetermined reference value.

(Supplementary Note 57)

The program for the control apparatus according to any one of supplementary notes 54 to 56, wherein the plurality of the predetermined transmission intervals are updated regularly or irregularly, and, at every time of the update, the setting of the predetermined transmission interval is performed.

(Supplementary Note 58)

A program for a to-be-controlled device, the program causing a computer to execute:

transmitting a reply signal at a predetermined transmission interval to a control apparatus that transmits a control signal when receiving the reply signal;

receiving the control signal; and calculating a communication delay time from a difference between a transmission time of the reply signal and a reception time of the control signal, and changing the predetermined transmission interval in such a way that a sum of the predetermined transmission interval and the communication delay time satisfies a predetermined condition.

(Supplementary Note 59)

The program for the to-be-controlled device according to supplementary note 58, wherein the reply signal is a communication packet each provided with a first identifier, the control signal is a communication packet provided with a second identifier associated with each first identifier, a transmission time of the reply signal is the transmission time of the reply signal provided with the first identifier, and the reception time of the control signal is a reception time of the control signal provided with the second identifier associated with the first identifier.

(Supplementary Note 60)

The program for the to-be-controlled device according to supplementary note 58 or 59, wherein the reply signal is sequentially transmitted at at least two of the predetermined transmission intervals among a plurality of the predetermined transmission intervals, and the predetermined transmission interval is set in such a way that a sum of the predetermined transmission interval and the communication delay time satisfies the predetermined condition.

(Supplementary Note 61)

The program for the to-be-controlled device according to any one of supplementary notes 59 to 60, wherein the predetermined condition is to reduce a sum of the predetermined transmission interval and the communication delay time.

(Supplementary Note 62)

The program for the to-be-controlled device according to supplementary note 61, wherein the predetermined condition further indicates that the predetermined transmission interval and the communication delay time exceed a predetermined reference value.

(Supplementary Note 63)

The program for the to-be-controlled device according to any one of supplementary notes 60 to 62, wherein the plurality of the predetermined transmission intervals are updated regularly or irregularly, and, at every time of the update, the setting of the predetermined transmission interval is performed.

(Supplementary Note 64)

A program for a to-be-controlled device, the program causing a computer to execute:

transmitting a reply signal at a predetermined transmission interval to a control apparatus that transmits a control signal when receiving the reply signal;

receiving the control signal; and changing the predetermined transmission interval in such a way that a difference between a sequence number provided for the latest transmitted reply signal and the sequence number provided for the latest received control signal satisfies a predetermined condition.

(Supplementary Note 65)

The program for the to-be-controlled device according to supplementary note 64, wherein the reply signal is sequentially transmitted at at least two of the predetermined transmission intervals among a plurality of the predetermined transmission intervals, and the predetermined transmission interval is set in such a way that the difference between the sequence number provided for the latest transmitted reply signal and the sequence number provided for the latest received control signal satisfies the predetermined condition.

(Supplementary Note 66)

The program for the to-be-controlled device according to supplementary note 64 or 65, wherein the predetermined condition indicates that the difference between the sequence number provided for the latest transmitted reply signal and the sequence number provided for the latest received control signal is small.

(Supplementary Note 67)

The program for the to-be-controlled device according to supplementary note 66, wherein the predetermined condition indicates that the difference between the sequence number provided for the latest transmitted reply signal and the sequence number provided for the latest received control signal exceeds a predetermined reference value.

(Supplementary Note 68)

The program for the to-be-controlled device according to any one of supplementary notes 65 to 67, wherein the plurality of the predetermined transmission intervals are updated regularly or irregularly, and, at every time of the update, the setting of the predetermined transmission interval is performed.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-222125, filed on Nov. 17, 2017, the disclosure of which is incorporated herein in its entirety by reference.

REFERENCE SIGNS LIST

20 Control system
30 Control system
40 Control system
50 Control system
60 Calculation processing device
61 Central processing unit (CPU)
62 Memory
63 Disc
64 Non-volatile recording medium
65 Input device
66 Output device
67 Communication interface
100 Control apparatus
101 Transmission unit
102 Reception unit
200 Control apparatus
201 Transmission unit
202 Reception unit
203 Control unit
300 To-be-controlled device
301 Transmission unit
302 Reception unit
400 Control apparatus
403 Control unit
500 To-be-controlled device
600 To-be-controlled device
700 Control apparatus
800 To-be-controlled device
2031 Transmission interval control unit
2032 Transmission time storage unit
2033 Communication delay time measurement unit
4034 Network queue calculation unit
6031 Transmission interval control unit

The invention claimed is:

1. A control apparatus comprising:
a transmission unit configured to transmit a control signal at a predetermined transmission interval to a to-be-controlled device that transmits a reply signal when receiving the control signal;
a reception unit configured to receive the reply signal; and
a control unit configured to calculate a communication delay time from a difference between a transmission time of the control signal and a reception time of the reply signal and changing the predetermined transmission interval in such a way that a sum of the predetermined transmission interval and the communication delay time satisfies a predetermined condition.

2. The control apparatus according to claim 1, wherein
the control signal is a communication packet each provided with a first identifier,
the reply signal is a communication packet provided with a second identifier associated with the first identifier,
the transmission time of the control signal is the transmission time of the control signal provided with the first identifier, and
the reception time of the reply signal is a reception time of the reply signal provided with the second identifier associated with the first identifier.

3. The control apparatus according to claim 1, wherein
the control apparatus stores a plurality of the predetermined transmission intervals, and the control unit sequentially transmits the control signal from the transmission unit at at least two of the predetermined transmission intervals among the plurality of the predetermined transmission intervals, and sets the predetermined transmission interval in such a way that a sum of the predetermined transmission interval and the communication delay time satisfies the predetermined condition.

4. The control apparatus according to claim 3, wherein the plurality of the predetermined transmission intervals are updated regularly or irregularly, and,
at every time of the update, the control unit performs the setting of the predetermined transmission interval.

5. The control apparatus according to claim 1, wherein the predetermined condition is to reduce a sum of the predetermined transmission interval and the communication delay time.

6. The control apparatus according to claim 5, wherein the predetermined condition further indicates that the predetermined transmission interval and the communication delay time exceeds a predetermined reference value.

7. A control apparatus comprising:
a transmission unit configured to transmit a control signal at a predetermined transmission interval to a to-be-controlled device that transmits a reply signal when receiving the control signal;
a reception unit configured to receive the reply signal; and
a control unit configured to change the predetermined transmission interval in such a way that a difference between a sequence number provided for a latest control signal transmitted from the transmission unit and a sequence number provided for a latest reply signal received by the reception unit satisfies a predetermined condition.

8. The control apparatus according to claim 7, wherein the control apparatus stores a plurality of the predetermined transmission intervals,
the control unit sequentially transmits the control signal from the transmission unit at at least two of the predetermined transmission intervals among the plurality of the predetermined transmission intervals, and sets the predetermined transmission interval in such a way that the difference between the sequence number provided for the latest control signal transmitted from the transmission unit and the sequence number provided for the latest reply signal received by the reception unit satisfies the predetermined condition.

9. The control apparatus according to claim 8, wherein the plurality of the predetermined transmission intervals are updated regularly or irregularly, and
at every time of the update, the control unit_performs the setting of the predetermined transmission interval.

10. The control apparatus according to claim 7, wherein the predetermined condition indicates that the difference between the sequence number provided for the latest control signal transmitted from the transmission unit and the sequence number provided for the latest reply signal received by the reception unit is small.

11. The control apparatus according to claim 10, wherein the predetermined condition further indicates that the difference between the sequence number provided for the latest control signal transmitted from the transmission unit and the sequence number provided for the latest reply signal received by the reception unit exceeds a predetermined reference value.

12. A to-be-controlled device comprising:
a transmission unit configured to transmit a reply signal at a predetermined transmission interval to a control apparatus that transmits a control signal when receiving the reply signal;
a reception unit configured to receive the control signal; and
a control unit configured to calculate a communication delay time from a difference between a transmission time of the reply signal and a reception time of the control signal, and changing the predetermined transmission interval in such a way that a sum of the predetermined transmission interval and the communication delay time satisfies a predetermined condition.

13. The to-be-controlled device according to claim 12, wherein
the reply signal is a communication packet each provided with a first identifier,
the control signal is a communication packet provided with a second identifier associated with the first identifier,
the transmission time of the reply signal is the transmission time of the reply signal provided with the first identifier, and
the reception time of the control signal is a reception time of the control signal provided with the second identifier associated with the first identifier.

14. The to-be-controlled device according to claim 12, wherein
the to-be-controlled device stores a plurality of the predetermined transmission intervals,
the control unit sequentially transmits the reply signal from the transmission unit at at least two of the predetermined transmission intervals among the plurality of the predetermined transmission intervals, and sets the predetermined transmission interval in such a way that a sum of the predetermined transmission interval and the communication delay time satisfies the predetermined condition.

15. The to-be-controlled device according to claim 14, wherein
the plurality of the predetermined transmission intervals are updated regularly or irregularly, and,
at every time of the update, the control unit performs the setting of the predetermined transmission interval.

16. The to-be-controlled device according to claim 12, wherein
the predetermined condition is to reduce a sum of the predetermined transmission interval and the communication delay time.

17. The to-be-controlled device according to claim 16, wherein
the predetermined condition further indicates that the predetermined transmission interval and the communication delay time exceed a predetermined reference value.

18. A to-be-controlled device comprising:
a transmission unit configured to transmit a reply signal at a predetermined transmission interval to a control apparatus that transmits a control signal when receiving the reply signal;
a reception unit configured to receive the control signal; and
a control unit configured to change the predetermined transmission interval in such a way that a difference between a sequence number provided for a latest reply signal transmitted from the transmission unit and a sequence number provided for a latest control signal received by the reception unit satisfies a predetermined condition.

19. The to-be-controlled device according to claim 18, wherein
the to-be-controlled device stores a plurality of the predetermined transmission intervals, and
the control unit sequentially transmits the reply signal from the transmission unit at at least two of the predetermined transmission intervals among the plurality of the predetermined transmission intervals, and sets the predetermined transmission interval in such a way that the difference between the sequence number provided for the latest reply signal transmitted from the transmission unit and the sequence number provided for the latest control signal received by the reception unit satisfies the predetermined condition.

20. The to-be-controlled device according to claim 19, wherein
the plurality of the predetermined transmission intervals are updated regularly or irregularly, and,
at every time of the update, the control unit performs the setting of the predetermined transmission interval.

21. The to-be-controlled device according to claim 18, wherein
the predetermined condition indicates that the difference between the sequence number provided for the latest reply signal transmitted from the transmission unit and the sequence number provided for the latest control signal received by the reception unit is small.

22. The to-be-controlled device according to claim 21, wherein
the predetermined condition further indicates that the difference between the sequence number provided for the latest reply signal transmitted from the transmission unit and the sequence number provided for the latest control signal received by the reception unit exceeds a predetermined reference value.

23. A control method comprising:
transmitting a control signal at a predetermined transmission interval to a to-be-controlled device that transmits a reply signal when receiving the control signal;
receiving the reply signal; and
calculating a communication delay time from a difference between a transmission time of the control signal and a reception time of the reply signal and changing the predetermined transmission interval in such a way that a sum of the predetermined transmission interval and the communication delay time satisfies a predetermined condition.

24. A control method comprising:
transmitting a control signal at a predetermined transmission interval to a to-be-controlled device that transmits a reply signal when receiving the control signal;
receiving the reply signal; and
changing the predetermined transmission interval in such a way that a difference between a sequence number provided for a latest transmitted control signal and a sequence number provided for a latest received reply signal satisfies a predetermined condition.

25. A control method of a to-be-controlled device comprising:
transmitting a reply signal at a predetermined transmission interval to a control apparatus that transmits a control signal when receiving the reply signal;
receiving the control signal; and
calculating a communication delay time from a difference between a transmission time of the reply signal and a reception time of the control signal, and changing the predetermined transmission interval in such a way that a sum of the predetermined transmission interval and the communication delay time satisfies a predetermined condition.

26. A control method of a to-be-controlled device comprising:
transmitting a reply signal at a predetermined transmission interval to a control apparatus that transmits a control signal when receiving the reply signal;
receiving the control signal; and
changing the predetermined transmission interval in such a way that a difference between a sequence number provided for a latest transmitted reply signal and a sequence number provided for a latest received control signal satisfies a predetermined condition.

* * * * *